Figure 3:
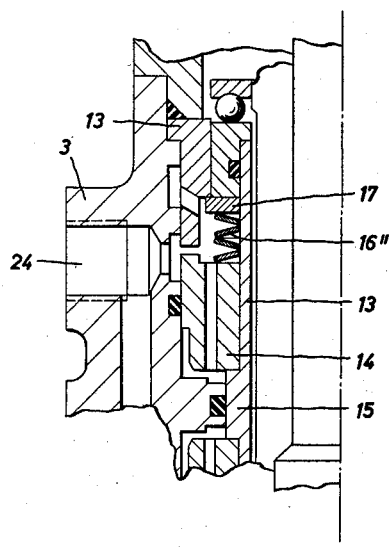

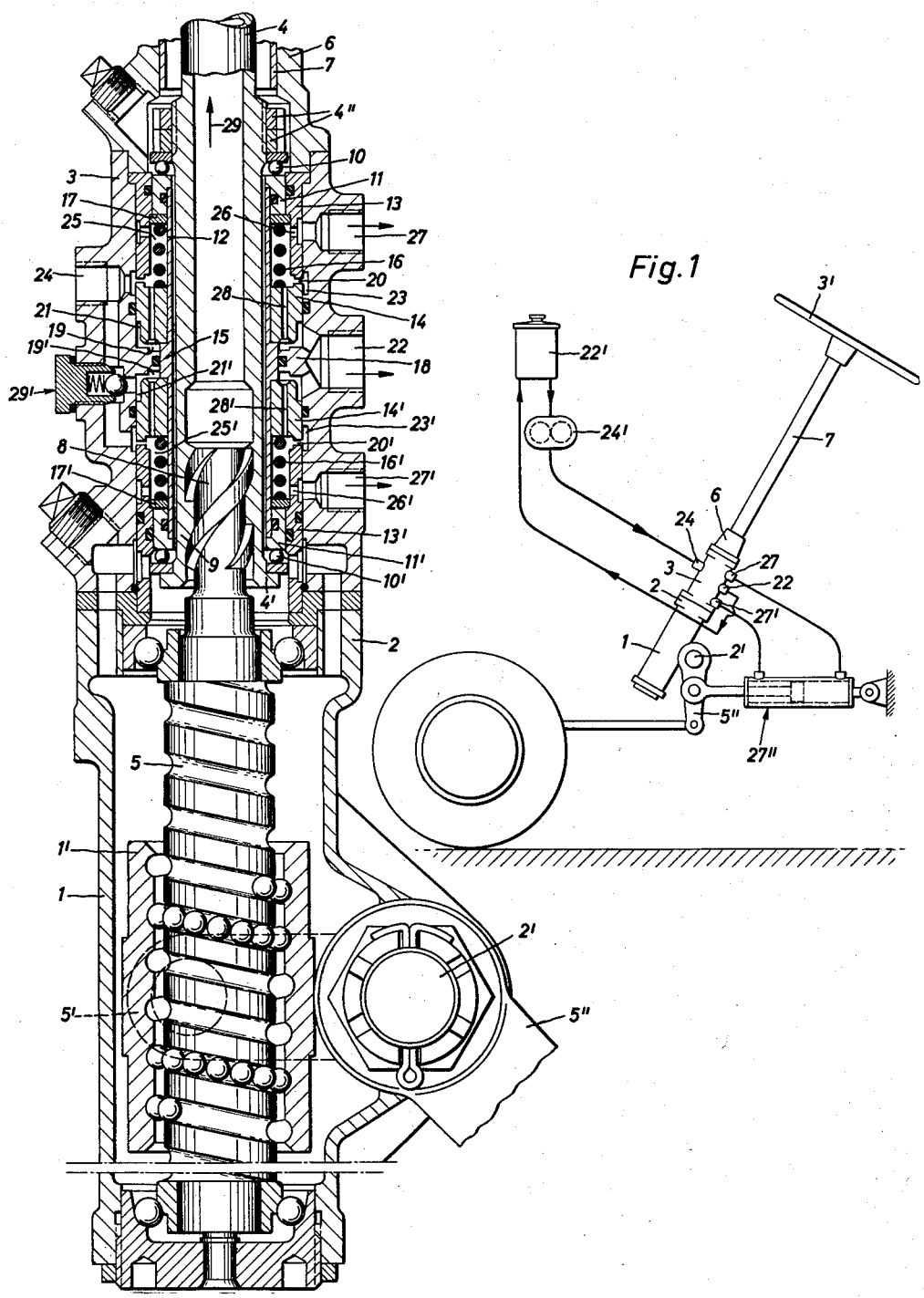

United States Patent Office 2,924,202
Patented Feb. 9, 1960

2,924,202

ARRANGEMENT FOR CONTROLLING AN AUXILIARY HYDRAULIC MOTOR, PARTICULARLY A MOTOR SERVING TO AUGMENT THE STEERING POWER IN MOTOR VEHICLES

Erwin Mazur, Edingen (Neckar), Rudolf Mittelstrass, Mannheim-Friedrichsfeld, and Hermann Reiter, Ludwigshafen (Rhine), Germany, assignors to Fulminawerk K.G. Franz Muller, Mannheim-Friedrichsfeld, Germany Application September 5, 1957, Serial No. 682,207

Claims priority, application Germany September 10, 1956

15 Claims. (Cl. 121—46.5)

The invention relates to an arrangement for controlling an auxiliary hydraulic motor, particularly a motor serving to augment the steering power in motor vehicles, and relates more specifically to such an arrangement in which the alterations of the cross sections of the supply and discharge ducts for the control means are performed through decreasing and increasing the distance between the control surfaces by means of a piston arranged slidably in a control casing, said control surfaces being in a position perpendicular to the direction of the control movements.

The object of the invention is to provide a control arrangement the construction of which is especially simple. A further object is that the arrangement requires as little space as possible and that it is, at the same time, safe in operation and with little wear.

An essential feature of the invention consists in that the pistons, designed as annular pistons, are slidably fitted, directly or indirectly, to an axially movable part which is intended to receive control commands; this part is provided with stop flanges against which bear the annular pistons in their neutral central position under the pressure of springs—preferably prestressed springs—whilst the pistons can be moved out of their central position by said flanges against the force of these springs.

A particularly simple construction is achieved if, according to a further feature of the invention, the axially movable part which receives the control command is designed as a sleeve through which passes the axially movable steering tube; said steering tube is provided with flanges against which bears the sleeve with its frontal face, preferably by means of ball bearings. Thereupon the annular pistons may be fitted movably to the control sleeve, which, in turn is slidably guided, by means of its piston-like central portion, within a cylinder portion located approximately in the middle of the control casing.

A very favourable feature, with respect to a smooth operation, is obtained by the following design: the annular gap, which is controlled by the annular pistons and which is arranged in the supply ducts for the control means receptacles, to be constructed larger than the annular gap, which is controlled by the same pistons but is arranged for the discharge ducts.

According to a special feature of the invention, the annular gaps are formed by the space between frontal surface of the annular pistons and frontal surfaces on the control casing. The frontal surfaces on the control casing may be formed by bushings fitted to it. A suitable arrangement is obtained by the frontal surfaces on the control casing, or on the bushings respectively acting as stops against which the annular pistons can bear, if the hydraulic operation fails for any reason whatsoever.

Additional essential features of the invention will be observed through the description to follow thereafter.

Embodiments by example of the invention are shown in the drawing, of which

Figure 4:
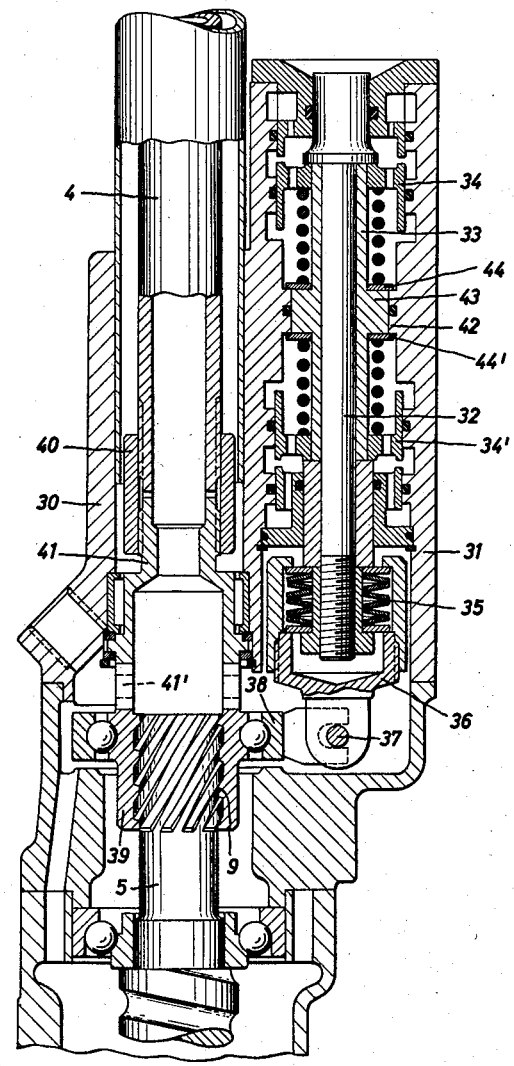

Fig. 1 is a schematic view of the different elements of the hydraulic steering equipment, Fig. 2 is a longitudinal section of a steering gear according to the invention, in which the steering shaft passes through the valve arrangement, Fig. 3 is a modified arrangement of the valve, shown in Fig. 2, with plate springs instead of helical springs, and Fig. 4 is a longitudinal section of a steering gear according to another embodiment of the invention, in which the valve arrangement is mounted in a lateral position with respect to the steering shaft.

The steering gear shown in Figs. 1 and 2 comprises a steering housing 1, wherein are arranged the different parts as usually applied for converting a rotating movement into a rocking movement. An essentially cylindrically shaped control casing 3, in which the valve arrangement is accommodated is secured to a flange 2 of the steering housing 1. The steering shaft, carrying the steering wheel 3' is split into two parts: the steering tube 4 and the steering spindle 5, and passes through the steering house 1 and the control casing 3. The end of the steering spindle 5, formed as worm gear, carries a steering nut 1'. The steering shaft 2', supported in the steering housing 1, is connected with an arm 5' acting together with the steering nut 1', Fig. 2. With the steering shaft 2' furthermore a steering lever 5'' is combined, transmitting the steering movement to the wheels of the car. A flange 6 is mounted on that side of the control casing 3 which is opposite to the steering casing 1, said flange being provided, in the usual manner, with a steering shield tube 7. The end of the steering spindle 5 facing the steering tube 4 is provided with a steep thread 8, into which engages a corresponding female thread 9 at the end of the steering tube 4.

The steering tube 4 is movable both axially and radially, whereby the steep thread 8, 9 serves as bearing at the end facing the steering housing, whilst the bearing arrangement, located near the steering wheel 3' may be of any known design. For the purpose of transferring the axial movement from the steering tube 4 to the control elements arranged in the control casing, two ball bearings or roller bearings 10 and 10' are provided. Two shoulder rings 11 and 11' respectively, which are provided with gasket rings, are also designed as bearing races and bear by their frontal surfaces against a control sleeve 12. The control sleeve surrounds the steering tube with some play. The shoulder rings 11 and 11' are journalled, slidably in the axial direction, in bushings 13 and 13' respectively, which are in turn secured within the control casing 3 to form the control cylinder. Two annular pistons 14, 14' are slidably mounted in the control cylinder between the bushings 13, 13'. The annular pistons bear, with their respective frontal sides facing each other, against an external ring flange 15 of the control sleeve under the bias of helical springs 16 and 16' respectively (preferably prestressed), whilst the far ends of these springs bear against rings 17 and 17' respectively. The rings 17 and 17' bear against the inner shoulders of the bushings 13 and 13' respectively. As shown in Fig. 3 instead of the helical springs, also plate springs 16'' can be used, thereby a more compact construction will be possible.

Between the two annular pistons 14 and 14' extends an internal flange 18 of the control casing. The frontal surfaces, of the annular pistons 14 and 14', facing each other form annular gaps 19 and 19' respectively in conjunction with the internal flange 18. The frontal surfaces at the far ends of the annular pistons 14 and 14', in conjunction with the frontal surfaces facing each other of the bushings 13 and 13' respectively, form annular gaps 20 and 20' respectively. The annular gaps 19 and 19' run into annular spaces 21 and 21' respectively, which are connected, by bores, with the return duct connection 22. The annular gaps 20 and 20' run outside into annular spaces 23 and 23' respectively, which are arranged in the control casing and are connected with the inlet 24 of the pump 24'. The annular gaps 20 and 20' are connected, towards the inside, with annular spaces 25 and 25' respectively which are connected by bores 26 and 26' respectively to outlets 27 and 27' respectively, which in turn lead to the operating cylinder 27" (Fig. 1). The spaces 25 and 25' have also access to the annular gaps 19 and 19' respectively by axial bores 28 and 28' respectively.

In the neutral position the width of each annular gap 19 and 19' is about two thirds of the width of each gap 20 and 20'.

The control sleeve 12 and the ball bearings 10 and 10' which engage the sleeve at either end form a unity, which bears against the outer flange 4' of the steering tube 4 on one hand, and which is secured tightly by nuts 4" screwed upon the steering tube, on the other hand.

The control spaces of the control arrangement are connected, in a manner known per se, through the supply duct to the oil pressure pump 24'; and further connected through the duct connection 22 to the return duct to the reservoir 22'; and connected, through the discharge connections 27 and 27' respectively, to the two operating sides of the working cylinder 27" of the hydraulic auxiliary motor (shown in Fig. 1), acting upon the steering lever 5".

In case there is during steering a resistance towards right or left in the steered vehicle wheels, the steering tube 4 will move in axial direction by sliding along the steep thread 8, 9. If, for instance, the steering tube shifts in the direction of the arrow 29, the steering sleeve 12, too, will be moved in this direction by means of the ball bearings 10 and 10'. Thereby, first of all the annular gap 19' is closed so that the oil return is interrupted at this side. The annular gap 19 is opened a little, simultaneously. Thereby, the pressure rises in the left hand space 25', upon which the pressure fluid impinges, as well as in the connected cylinder side of the working cylinder.

If the wheel reaction acting on the steering tube rises still more, the annular gap will be closed entirely, so that the full pump pressure will become effective.

Correspondingly, similar action will take place upon shifting of the steering tube 4 in the opposite direction.

In case of failure of the auxiliary steering for instance in case of troubles of the pressure oil supply from pump 24', the amply dimensioned tightening surfaces between the annular pistons 14, 14' and the bushings 13 and 13' respectively will serve as mechanical stop. Therefore, the steering action can continue forthwith.

In order to avoid, in case of failure of the hydraulic system, a troublesome influence upon the mechanical steering by the working piston, a one-directional overflow-valve 29' is provided. The effect of this arrangement is that, in case of failure of the hydraulic system, the oil will overflow from one side of the working cylinder to the other exemplified on the way over the following valve ducts: 27, 26, 25, 28, 19, 22, 21', 29', 23', 25', 27', 26', while no vacuum will be caused in the hydraulic system.

The valve arrangement according to the invention can, of course be used also in such power steering systems, in which the movement transfer to the steering leg is effected by means other than ball train gearing.

The steering tube 4 may be supported, at its end near the steering spindle 5, by a special pin bearing in the control casing. It is also feasible to fit an intermediate casing between steering housing 1 and control casing 3, and in this intermediate casing additional control means can be accommodated, and, if the case requires, axial bearings for the steering spindle.

In the embodiment shown in Fig. 4, the valve arrangement is mounted by the side of the steering tube. The control casing has an axial extension 31 with a bore running parallel to the steering tube, said bore containing the valve arrangement.

In this case, the valve arrangement consists essentially of an axially movable rod 32, enclosed by a sleeve 33 secured tightly to it. Axially shifting pistons 34 and 34' are fitted to the sleeve. These pistons, in conjunction with the parts adapted to them, perform the same function as the pistons 14 and 14' in Fig. 1 do. Accordingly, the corresponding valve seats and ducts are provided, as they were explained with reference to the embodiment as per Fig. 1. The head of the rod 32 is biased against a cap 36 by means of prestressed pressure springs 35, said cap being connected, by means of a slot-and-pin coupling 37, with the outer race 38 of a ball bearing, the inner race 39 of which having a steep female thread 9, in which a steering spindle 5 engages from one side. On the opposite side the inner race 39 is provided with claws 41', engaging in the end of the steering tube 41. In that case the steering tube 4, which is connected by means of a nut 40 with the steering tube 41, does not carry out any axial movement depending on the torque occurring, but only the inner race 39, which transmits the axial movement over the outer race 38 to the rod 32 of the valve arrangement. The piston valves fitted on the rod 32 effect, thereupon the adequate hydraulic control of the auxiliary hydraulic motor. The central cylinder part 42 of the control housing 30 has, in the embodiment shown in Fig. 4, the same width as the piston-like central part 43 guided in 42. At each side of the parts 42 and 43 a covering intermediate washer 44 and 44' respectively is provided, both washers bearing against the return springs.

We claim:

1. In a steering mechanism for a motor vehicle steering lever having a rotatable axially movable steering column, means positively engaging said steering column for rotation therewith and actuation of said steering lever, hydraulic control means for auxiliary movement of said steering lever, a control casing disposed axially around said steering column, piston means disposed between said column and said control casing for axial movement with said column, a plurality of annular spaces between said piston means and said control casing, duct means on said control casing for supplying and discharging fluid to said annular spaces and to said hydraulic control means, pump means connected to said duct means for providing said fluid to said duct means, and resilient means in said annular spaces biasing said piston means to a predetermined neutral position, whereby axial motion of said column causes changes in volume of said annular spaces for actuating said hydraulic control means.

2. In a steering mechanism as set forth in claim 1, axial bores in said piston means for conduction of said fluid between said annular spaces.

3. In a steering mechanism as set forth in claim 2, a control sleeve slidably disposed between said piston means in said column, an axially outward projection along the longitudinal center of said sleeve disposed for axial abutment with said piston means, and an axially inward projection on said control casing for shiftable engagement with said projection on said sleeve.

4. In a steering mechanism as set forth in claim 2, a sleeve in said control casing, a radially outward projection in the longitudinal center of said sleeve, a radially inward projection on said control casing for slidably engaging said projection on said sleeve, a plurality of washers annularly placed about said sleeve and abutting said projection on said sleeve, resilient means annularly disposed about said sleeve and abutting said washer means.

5. In a steering mechanism as set forth in claim 2, a sleeve annularly disposed about said column, an axially outward projection on the longitudinal center of said sleeve, and an axially inward projection on said control casing slidably engaging said outward projection on said sleeve, said piston means including a plurality of individual longitudinal surfaces, said individual longitudinal surfaces being greater than said longitudinal surface of said axially outward projection on said sleeve.

6. In a steering mechanism as set forth in claim 5, said plurality of annular gaps including gaps disposed between said individual piston surfaces and gaps longitudinally outward with respect to said individual piston surfaces, said longitudinally outward gaps being greater than said gaps between said surfaces.

7. In a steering mechanism as set forth in claim 4, a pressure spring operatively disposed between said sleeve and said steering column.

8. In a steering mechanism as set forth in claim 7, said pressure spring having sufficient strength to overcome a reactive force by said sleeve.

9. In a steering mechanism as set forth in claim 8, flanges on said steering column, ball bearings annularly disposed about said steering column and axially disposed with respect to said flanges, said ball bearings providing axial thrust against said sleeve.

10. In a steering mechanism as set forth in claim 9, said longitudinally outward annular gaps being formed by said control casing and said piston means.

11. In a steering mechanism as set forth in claim 10, bushings axially inward from said control casing and mounted on said control casing for providing an additional enclosure surface for said axial bores.

12. In a steering mechanism as set forth in claim 11, said bushings being spaced from said piston means to provide stops for the axial motion of said piston means during failure of said motor means.

13. In a steering mechanism as set forth in claim 12, said resilient means being disposed between said bushing and said piston means.

14. In a steering mechanism as set forth in claim 13, means engaging said steering column, providing for axial motion of said steering column, said axial motion resulting from resistance by said steering lever to rotary motion of said steering column.

15. In a steering mechanism as set forth in claim 14, said means providing axial motion including a thread engaging said steering column, said thread having sufficient angle to transmit rotary motion of said steering column when resistance to motion of said steering lever is below a predetermined minimum and to provide axial motion to said steering column when resistance to motion of said steering lever exceeds a predetermined minimum.

References Cited in the file of this patent

UNITED STATES PATENTS 2,788,770     Folkerts _____ Apr. 16, 1957